Dec. 18, 1956     K. J. SYLVEST     2,774,637
APPARATUS FOR CONVEYING PULVERULENT MATERIAL
Filed Feb. 24, 1954     3 Sheets-Sheet 1
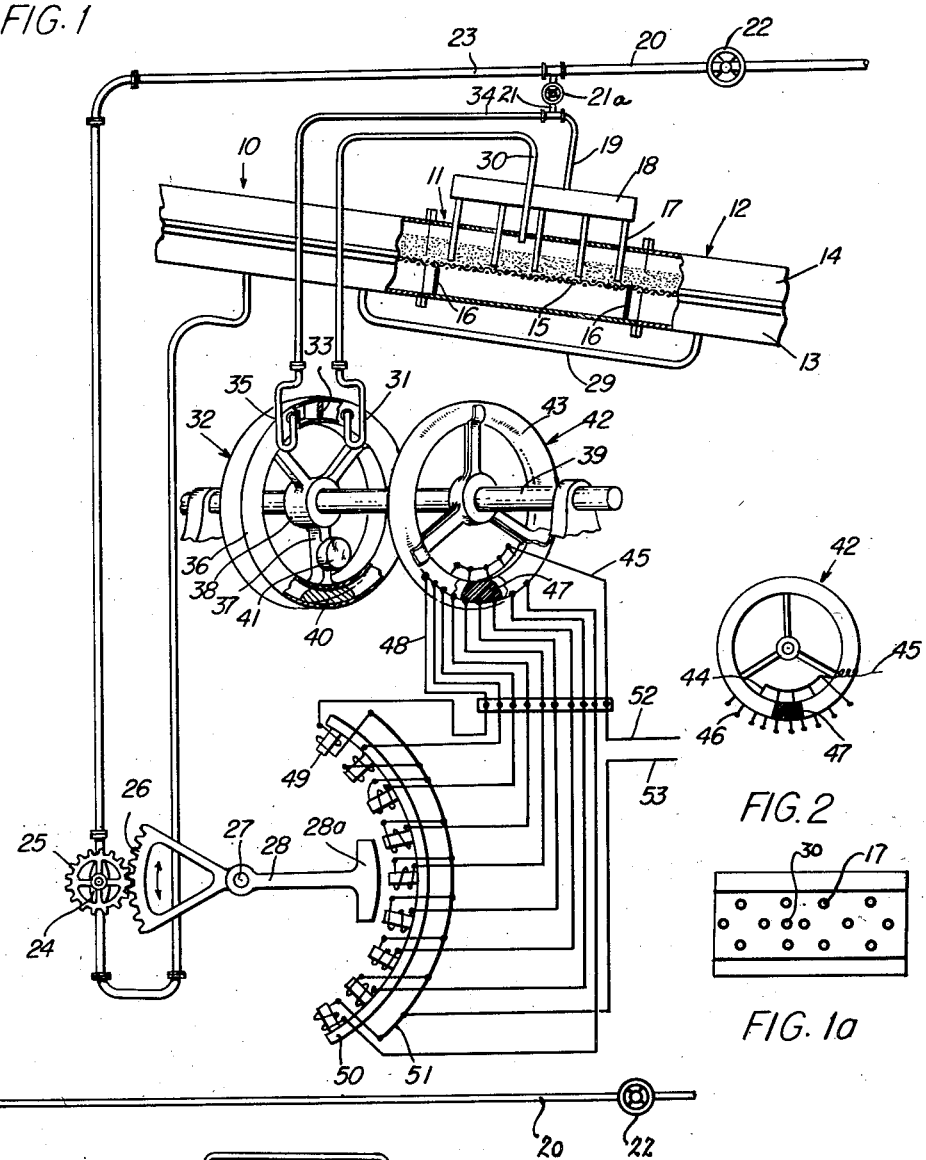
INVENTOR.
Karl Jens Sylvest
BY
ATTORNEYS Dec. 18, 1956 K. J. SYLVEST 2,774,637
APPARATUS FOR CONVEYING PULVERULENT MATERIAL
Filed Feb. 24, 1954 3 Sheets-Sheet 2

INVENTOR.
Karl Jens Sylvest
BY
Pennie Edmonds Morton Barrows Taylor
ATTORNEYS

Dec. 18, 1956  K. J. SYLVEST  2,774,637
APPARATUS FOR CONVEYING PULVERULENT MATERIAL
Filed Feb. 24, 1954  3 Sheets-Sheet 3

INVENTOR.
Karl Jens Sylvest
BY
Pennie Edmonds Morton Barrows & Taylor
ATTORNEYS

United States Patent Office 2,774,637
Patented Dec. 18, 1956

2,774,637

APPARATUS FOR CONVEYING PULVERULENT MATERIAL

Karl Jens Sylvest, Copenhagen, Denmark, assignor to F. L. Smidth & Co., New York, N. Y., a corporation of New Jersey Application February 24, 1954, Serial No. 412,345

12 Claims. (Cl. 302—29)

This invention relates to systems for conveying pulverulent material and is concerned more particularly with a novel conveying system making use of pneumatic channels, which is provided with means continuously responding to variations in the weight of material being conveyed. In the new system, the variations in weight of the material passing through the system may be utilized to control the conveying operation to the end that a constant weight of material will be conveyed per unit of time, or the system may be equipped with an integrating meter operating in response to variations in the weight of the material being conveyed and to the velocity of the material to indicate the total weight of material passed through the system in a selected time interval.

The system of the invention is similar to that disclosed in my co-pending application, Ser. No. 312,842, filed October 2, 1952, but differs from the prior system in a number of respects. In the prior system, the pulverulent material is advanced by means of pneumatic channels, one of which is suspended for vertical movement without change in its inclination. The suspended channel is counter-balanced and the variations in the load of the material therein cause the channel to rise and fall. The vertical movements of the suspended channel resulting from variations in the weight of the material therein are then employed to control the rate of travel of the material through the system or are transmitted to the means in the integrating meter responsive to changes in the weight of the material. In such a system, the suspended channel is ordinarily supported on the platform or by the beam of a weighing scale and it is connected to a stationary channel delivering material thereto by means, such as a flexible sleeve, which permit free movement of the suspended channel relative to the fixed channel.

In a pneumatic channel, the material is actually suspended in air, which renders the material fluent and ordinarily enters the material through the air-permeable partition of the channel, over which the material travels. Tests have established that the pressure drop of the air passing through such a layer of material being conveyed in a pneumatic channel is related to the weight of the material, as, for example, the pressure drop of the air passed through the layer and measured in millimeters (water gauge) is equal to the weight in kilograms of the material covering a square meter of the surface of the air-permeable partition. Accordingly, it is possible to determine the quantity of material traveling through a pneumatic channel by measuring the pressure drop of the air passed through the layer of material for fluidizing purposes, and the determination of the weight of the material by measurement of the pressure drop of the air makes it unnecessary to use a suspended channel, a weighing scale, etc.

In the new apparatus, variations in the pressure drop of the air passing through the layer of material being conveyed are employed to vary the position of an element, which may be employed to regulate the rate, at which the material is conveyed, or may be used to supply information to an integrating meter, in which velocity and weight are multiplied.

For a better understanding of the invention, reference may be made to the accompanying drawings, in which Fig. 1 is a view of one form of the system of the invention, the apparatus being shown partly in elevation and partly in section and with features shown diagrammatically;

Fig. 1a is a bottom plan view of means for introducing air into the layer of material;

Fig. 2 is a front elevational view of a mercury switch used in the apparatus shown in Fig. 1;

Figs. 5–8 incl., are views similar to Fig. 1, showing the essential features of modified constructions.

Figure 3:
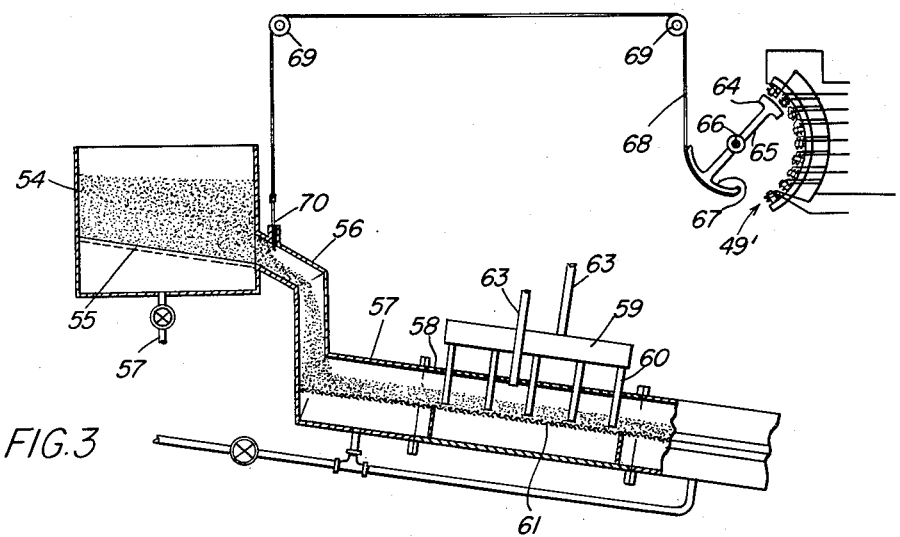
Fig. 3 is a view similar to Fig. 1 of a modified form of the apparatus.

The apparatus shown in Fig. 1 includes means responsive to variations in the weight of the material being conveyed for controlling the rate at which the material is conveyed. The system comprises a number of inclined pneumatic channels 10, 11, and 12 connected end to end by flanges and supported in fixed position on suitable supports. Each channel is of the covered type and includes a bottom trough 13 having lateral flanges connected to those of an inverted trough 14, which serves as a cover. A partition 15 extends across the channel between the flanges of the troughs and is made of a material, which may be penetrated by air supplied through the bottom of trough 13, but is impermeable to the pulverulent material being conveyed.

The channel 11 functions as a weighing and control channel and, in addition to the features mentioned, it includes a pair of plates 16 mounted across the ends of its bottom trough 13 and shutting off the space in the channel beneath the partition 15 from the corresponding spaces in the adjacent channels. A plurality of pipes 17 leading from a manifold 18 project downwardly in a number of rows through the top trough 14 of the channel 11 to terminate close to the partition 15 and within the bed of the layer of the material being conveyed, the pipes in each row being spaced in the direction of material flow. Air enters the manifold 18 from a line 19, which leads from a main line 20 through a branch 21 containing a valve 21a. Flow of air through the main line is controlled by a valve 22.

A branch line 23 leads from the main line into the bottom of channel 10 and contains a valve 24 operable by a gear 25 to regulate the amount of air supplied for fluidizing the material traveling through the channels and thus to control the fluidity and the rate of flow of the material. Gear 25 meshes with a segment gear 26, which is attached to a shaft 27 provided with an arm 28 having an armature 28a at its free end. The arm 28 with its armature serves as the element previously mentioned. A line 29 connects the bottom of channel 10 to the bottom of channel 12.

Air from the pipes 17 is diffused into the layer of pulverulent material within channel 11 to maintain the material fluent and, as it passes through the layer, the air undergoes a drop in pressure. A line 30 leads from the top of the channel 11 and is connected by a flexible hose 31 to one inlet of a ring balance 32 at one side of a fixed partition 33 therein. Air at main line pressure is delivered through branch 21 to a line 34, which is connected by a flexible hose 35 to the second inlet of the ring balance at the opposite side of partition 33 from the first inlet. In the ring balance, the pressure of the air, which has undergone a pressure drop by passage through the layer of material in channel 11, is compared with the pressure of the air in the main line.

The ring balance comprises a hollow annular member having spokes 37 attached to a hub 38 fast on a shaft 39 freely rotatable in suitable bearings. The hollow member contains a body of mercury 40, which divides the interior of the member into two chambers lying between the mercury and partition 33 and having the respective inlets. The ring balance is provided with a weight 41, which tends to maintain the balance in position with the fixed partition 33 at the top and the movable mercury partition 40 at the bottom.

Shaft 39 carries a mercury switch 42, which comprises an annular tube 43 having a number of terminals 44 extending through the upper wall of the lower part of the tube and connected together and to a lead 45. The tube is also provided with a plurality of terminals 46, which extend through the lower wall of the tube below terminals 44. A drop of mercury 47 within the switch connects terminals 44 to terminals 46, as will be explained. The terminals 46 are connected by lines 48 to respective electromagnets 49 mounted on an arcuate support 50 and lying close to the path of travel of the armature 28a. The electromagnets are also connected to a common return line 51 and the lead 45 and the line 51 are connected by lines 52, 53, respectively, to opposite sides of a source of power.

In the use of the apparatus, air at main line pressure enters one compartment of the ring balance between fixed partition 33 and the mercury 40, while the other compartment of the balance is in communication with the interior of channel 11, where the air from the main line has undergone a pressure drop by reason of its passage through the pulverulent material in the channel. As a result of the unbalanced pressures acting at opposite sides of the fixed partition 33, the ring balance tends to rotate through an arc varying with the difference between the pressures, and the rotation of the ring balance and of shaft 39 causes rotation of the mercury switch 42. The mercury drop 47 in the switch is of such size that it always connects at least one terminal 44 with at least two and no more than three of the terminals 46, so that at least two and no more than three of the electromagnets 49 are energized. The armature 28a is of sufficient size to span three electromagnets. Accordingly, when a pair of adjacent electromagnets are energized, a magnetic circuit is set up through the core of one electromagnet, the armature, and the core of the other, and the armature tends to center itself relative to the two electromagnets. If three electromagnets are energized, the same action takes place, except that there are two magnetic circuits through the armature instead of one. The position of the armature at any particular time thus depends on the electromagnets, which are energized, and this, in turn, depends on the drop in pressure of the air passing through the layer of pulverulent material in channel 11. As the armature is moved, it adjusts the valve 24 to vary the supply of air to channels 10 and 12 inversely with the pressure drop in the air and, thus, inversely with the weight of the material in channel 11. As the air supply to channels 10 and 12 increases, the rate of flow of the material through the system increases, and vice versa.

In the modified construction shown in Fig. 3, the material to be conveyed is contained in a vessel 54 having an inclined false bottom 55 leading to an outlet opening, from which a duct 56 extends. The false bottom is air-permeable and air is supplied to the vessel through a line 57 to enter the material through the false bottom and render the material fluent. The duct 56 leads to a pneumatic channel 57, which is connected to a channel 58 corresponding to channel 11 and provided with a manifold 59 having pipes 60 leading into the channel through the top and terminating close to the partition 61 within the channel. Air from a main line is supplied to manifold 59 through a line 62 corresponding to line 19 and the interior of the channel 58 above the material is connected through a line 63, corresponding to line 34, to a chamber in a ring balance. The ring balance is of the construction illustrated in Fig. 1 and it operates a mercury switch, which controls the energization of a series of electromagnets 49' corresponding to electromagnets 49. Electromagnets 49' act on an armature 64, which is mounted on one end of a lever 65 pivoted at 66 and provided at its other end with an arcuate arm 67, to which is attached a cable 68. The cable passes over idler pulleys 69 and is connected to a damper 70, which extends into duct 56. The lever 65 with its armature 64 forms the control element of the apparatus.

In the operation of the apparatus shown in Fig. 3, the armature 64 is moved to different positions by electromagnets 49' according to variations in the pressure drop of the air passing through the layer of pulverulent material in channel 58, and, thus, in accordance with variations in the weight of the material. The position of the armature determines the position of the damper 70, which controls the rate of discharge of the material from vessel 54, and the rate of flow of the material is thus maintained uniform.

Figure 4:
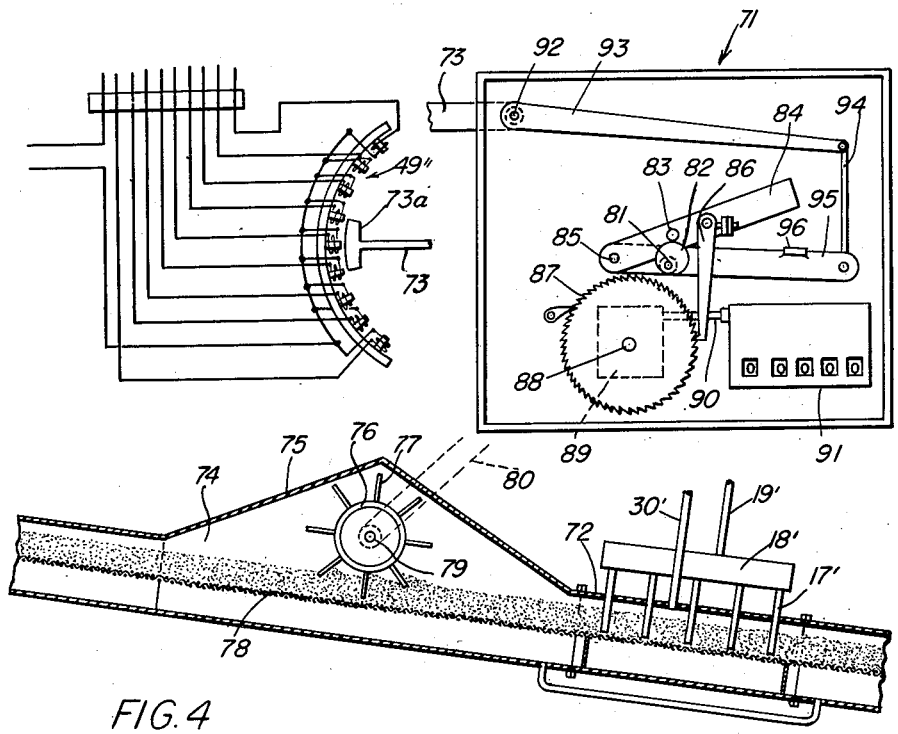
Fig. 4 is a view similar to Fig. 1 of a second modified form of the apparatus.

In the construction shown in Fig. 4, the system is equipped with an integrating meter of well known construction generally designated 71, in which the weight of the material within a channel is multiplied by the velocity of the material and the total weight of the material being conveyed is indicated. This form of the system includes a channel 72, which is similar to channel 11 and is provided with means for fluidizing the pulverulent material passing through the channel and including pipes 17' and manifold 18' and a branch air supply line 19' leading to the manifold. The section is also provided with an exhaust line 30' and the system includes a ring balance, a mercury switch, etc., for energizing a series of contacts 49'' and thereby varying the position of an armature 73a on an arm 73 in accordance with variations in the weight of the material being conveyed through channel 72. The channel 74 adjacent the channel 72 is provided with an enlarged top 75, in which is mounted a wheel 76 having radial vanes 77 entering the layer of material traveling along the air permeable partition 78 within the channel. The wheel 76 is mounted on a shaft 79 in bearings in the walls of the top 75 of the channel 74. The wheel 76 is mounted in such relation to the partition 78 within the channel 74 that the vanes 77 on the wheel enter the material and are moved therewith, so that the wheel rotates at a rate corresponding to the velocity of flow of the material through the channel. The shaft 79 rotated by the wheel 76 is connected by a belt 80 to a rotating part of the integrating meter 71. The meter includes a shaft 81 carrying a pulley (not shown) driven by the belt 80, and the shaft 81 carries an eccentric 82 engaging a projection 83 on an arm 84 freely movable on a fixed pivot 85. Arm 84 carries a weighted pawl 86 which engages a ratchet wheel 87 on a shaft 88 which is the input shaft of the gear box 89. The output shaft 90 of the gear box actuates a counting mechanism 91.

Arm 73 is rotatable on a pivot 92 to rock a lever 93 of the integrating meter. The opposite end of the lever 93 is connected by a link 94 to an arm 95 mounted to swing on pivot 85 and provided with a projection 96, which engages and limits the downward movement of arm 84.

In the operation of the apparatus shown in Fig. 4, the rate of rotation of the wheel 76 determines the velocity input to the integrating meter 71, and the position of the armature 73a determines the weight input to the integrating meter. Rotation of the wheel 76 rotates the eccentric 81 and thus periodically raises and lowers the arm 84 through projection 83, so that the pawl 86 advances the ratchet wheel 87 on the downward movement of the arm 84 by a number of teeth depending on the position of the projection 96. If the weight of the material in the channel 72 changes, the position of the armature 73a changes and, as a result, arm 73 rocks the lever 93 and arm 95. The position of projection 96 relative to arm 84 is thus changed and the length of the downward stroke of arm 84 and the amount of the advance of ratchet wheel 87 by pawl 86 are varied. The amount of rotation imparted to the ratchet wheel 87 by the stepwise movement of the weighted pawl 86, as determined by the position of armature 73a and the velocity of wheel 76, determines the input to the gear box 89 and the produce of the weight and velocity of the pulverulent material is expressed in the counting mechanism 91.

In the forms of the conveying system shown in Figs. 1–4, incl., the air, which undergoes a pressure drop by being passed through the layer of pulverulent material, is introduced into the layer at points close to the permeable partition, on which the layer is traveling. This construction is preferred, since the air does not pass through the partition and thus errors in control or in the indication of the integrating meter do not arise, because of variations in the permeability of the partition resulting from partial clogging. When the air is thus introduced into the material and does not travel through the partition, it is necessary to employ a number of pipes, such as pipes 17, so that an average value of the pressure drop of the air in passing through the material may be obtained. For some purposes, such errors as may arise from partial clogging of the partition may be disregarded and, in that event, it is unnecessary to use a number of pipes for introducing air into the layer of material and the simpler constructions shown in Figs. 5, 6, and 8 may be employed.

Figure 5:
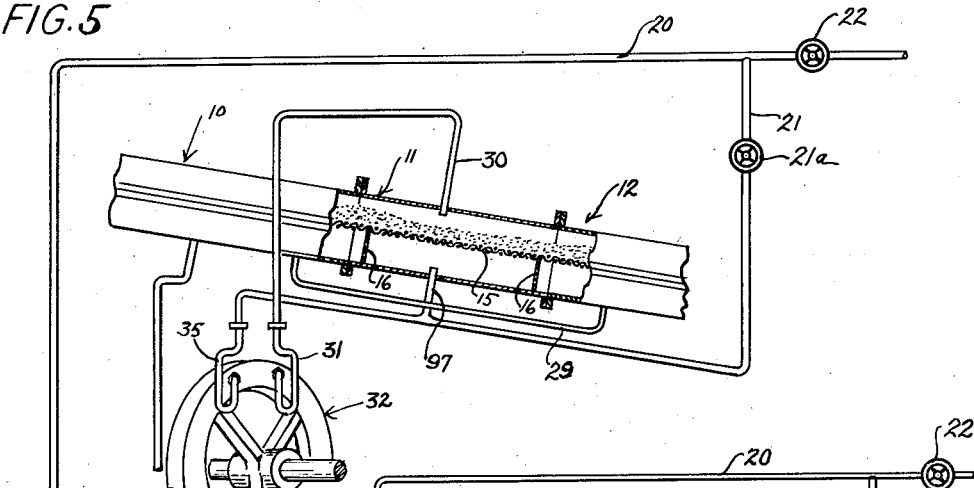
Figure 6:
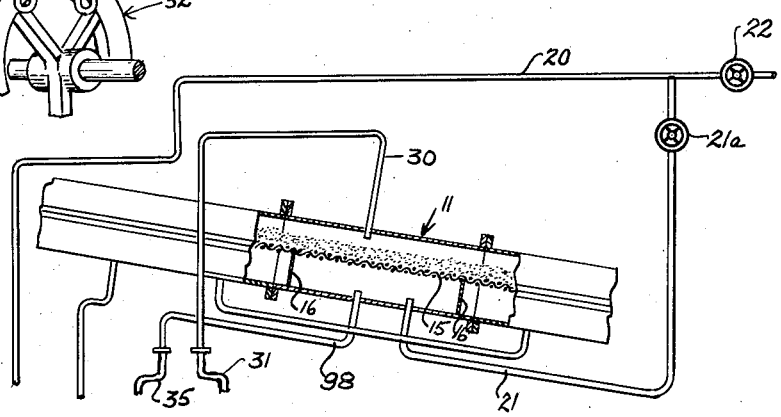

In Figs. 5, 6, and 8, the parts, which are the same as those of the system shown in Fig. 1, are identified by the same reference characters. The parts of the form of the system shown in Fig. 8, which are the same as those of the Fig. 1 system, are also marked by the same characters. In the modified form of the system illustrated in Fig. 5, air from the line 20 is supplied through branch 21 and discharged through a second branch 97 into the bottom of channel 11 below the partition 15 and between plates 16. Branch 21 continues past branch 97 and is connected by the flexible hose 35 to one inlet of the ring balance 32. Air from channel 11 above partition 15 passes through line 30 to the flexible hose 31 connected to a second inlet of the ring balance. With the construction described, the air under pressure admitted to channel 11 below partition 15 through the branch 97 passes through the partition and through the material to fluidize the material. As the air is diffused through the material, the air within channel 11 above the material has undergone a drop in pressure, which is an average value of various pressure drops of the air flowing through the partition 15 and the layer of material at various places within channel 11. The ring balance thus responds to the difference between main line air pressure and the average pressure of the air after the pressure drop.

In the construction shown in Fig. 5, the branch air line 21 continues past the sub-branch 97 to the flexible hose 35, by which the end of the line is attached to an inlet of the ring balance 32. If desired, this arrangement may be simplified as shown in Fig. 6, in which line 21 terminates within channel 11 below partition 15 and the space within the channel below partition 15 is connected through a line 98 and the flexible hose 35 to one inlet of the ring balance. The other inlet of the ring balance is connected by a flexible hose 31 to a line 30 leading from the interior of channel 11 above partition 15.

Figure 7:
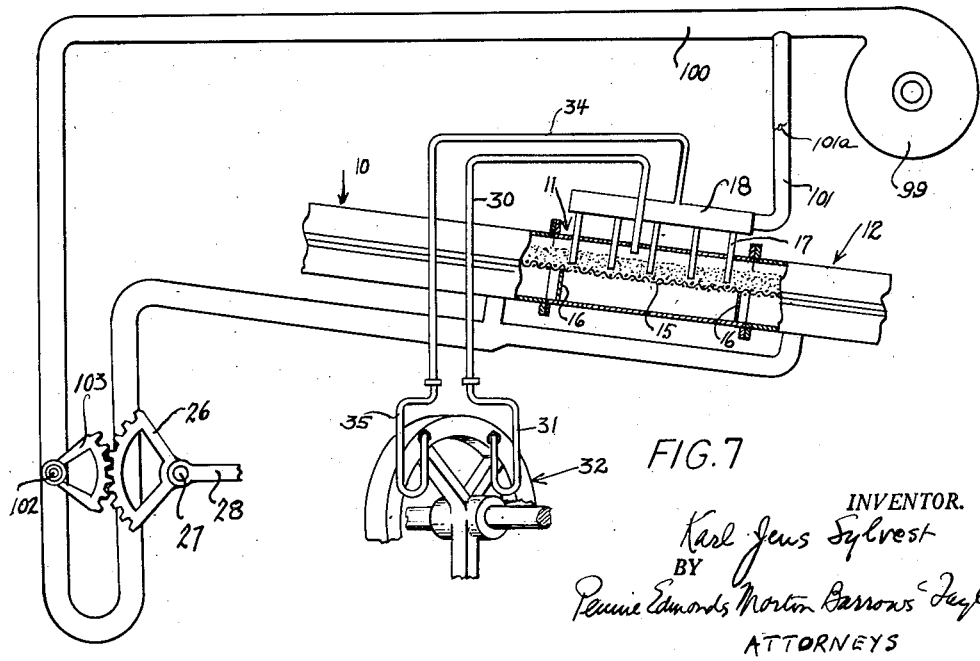

In the constructions above described, high pressure air is supplied through the main line 20 but, if desired, the air employed in the system may be supplied by a low pressure source, such as the fan 99 shown in the modified form of the system illustrated in Fig. 7. When such a fan is used, its output duct 100 may be connected by a branch duct 101 to a manifold 18 provided with pipes 17 extending through the top of channel 11 and terminating close to the partition 15 between the plates 16. Air, which has passed through the layer of material or partition 15 and has undergone a pressure drop, enters one chamber in the ring balance 32 through a line 30, which leads from the top of channel 11 and is connected by a flexible hose 31 to the inlet of the chamber. The manifold 18 is connected by a line 34 and a flexible hose 35 to the other chamber of the ring balance.

In the form of the system shown in Fig. 7, the air supplied to channels 10 and 12 for fluidizing the material on the partition 15 therein is controlled by a damper 102 in line 100. The damper is movable by a segment gear 103, with which segment gear 26 meshes. Gear 26, as in the Fig. 1 construction, is operated by an arm 28 pivoted at 27 and carrying an armature. The use of the low pressure source of air, as shown in Fig. 7, is not limited in its utility to the specific means, including pipes 17 and manifold 18, for introducing air into the layer of material, and the low pressure air may be used in any of the other forms of the system illustrated.

In all forms of the system above described, the measurements of the pressure drop of the air are made in a pneumatic channel 11, which is provided with plates 16 for shutting off the space beneath partition 15 in the channel from the spaces beneath the partition in adjacent channels. While it is advantageous in some instances to limit the area, through which the measurements of pressure drop are taken, such limitation is not always important and, if the limitation may be omitted, the system can be simplified, as shown in Fig. 8. In the Fig. 8 form of the system, the space in channel 11 below the partition 15 is open to the corresponding spaces in the channels at either side thereof. Air for fluidizing the material passing through the channels is supplied through line 20 to the space in channel 10 below partition 15 and the air flows to occupy the entire space beneath partition 15 in the connected channels. The air flows through the partition 15 and the layer of material thereon and a line 30 connects the space in channel 11 above the layer of material to one chamber of a ring balance (not shown). The other chamber in the ring balance receives air under pressure from beneath partition 15 in channel 11 through a line 104.

I claim:

1. In a system for conveying pulverulent material, the combination of a covered channel having an inclined bottom, means for supplying the material to the channel at the high end, a source of air under pressure, means for passing air from the source through the material in the channel to render the material sufficiently fluent to form a layer flowing along the bottom of the channel, means for varying the action of the supplying means, and means responsive to the difference in pressure of the air before and after it has passed through the layer of material to vary the action of the supplying means, said responsive means being normally inactive.

2. In a system for conveying pulverulent material, the combination of a covered channel having an inclined bottom, means for supplying the material to the channel at the high end, a source of air under pressure, means for passing air from the source through the material in the channel to render the material sufficiently fluent to form a layer flowing along the bottom of the channel, a movable control element, means responsive to the difference in pressure of the air before and after it has passed through the layer to vary the position of the control element, said responsive means being normally inactive, and means operated by the control element for regulating the material supply means.

3. In a system for conveying pulverulent material, the combination of a covered inclined channel, pneumatic means connected to the high end of the covered channel and supplying fluidized pulverulent material thereto, a source of air under pressure, a connection for supplying air from the source to the pneumatic means, means for passing air from the source through the layer of material flowing through the covered channel to maintain the fluidity of the material, means for regulating the flow of air to said pneumatic means through said connection, and means responsive to the difference in pressure of the air before and after it has passed through the layer for operating the regulating means.

4. In a system for conveying pulverulent material, the combination of a covered inclined channel, means for supplying the material to the channel at the high end, a damper for controlling the rate of supply of the material, a source of air under pressure, means for passing air from the source through the material in the channel to render the material sufficiently fluent to form a layer flowing along the bottom of the channel, means for operating the damper, and means responsive to the difference in pressure of the air before and after it has passed through the layer for controlling the damper-operating means, said responsive means being normally inactive.

5. In a system for conveying pulverulent material, the combination of a covered channel having an inclined bottom, means for supplying the material to the channel at the high end, a source of air under pressure, means for passing air from the source through the material in the channel to render the material sufficiently fluent to form a layer flowing along the bottom of the channel, and means responsive to differences in pressure of the air before and after it has passed through the layer for controlling the action of the supplying means, said responsive means including a hollow member containing a pair of chambers separated by a movable partition, inlets to the respective chambers, a connection to one inlet from the source, and a connection to the other inlet from the interior of said channel above the layer of material therein.

6. In a system for conveying pulverulent material, the combination of a covered channel having an inclined bottom, means for supplying the material to the channel at the high end, a source of air under pressure, means for passing air from the source through the material in the channel to render it sufficiently fluent to form a layer flowing along the bottom of the channel, electromagnetic means for varying the action of the supplying means, and means responsive to variations in the difference in pressure of the air before and after it has passed through the layer for operating the electromagnetic means.

7. In a system for conveying pulverulent material, the combination of a covered channel having an inclined bottom, means for supplying the material to the channel at the high end, a source of air under pressure, means for passing air from the source through the material in the channel to render it sufficiently fluent to form a layer flowing along the bottom of the channel, and means for varying the action of the supplying means in response to variations in the difference in pressure of air before and after it has passed through said layer, said means including a hollow annular member mounted for rotary movement about its center and containing a pair of chambers separated by a movable partition, the member having a rotational movement with movement of the partition, inlets to the respective chambers, a connection through which air at source pressure enters one chamber, a connection to the other inlet from the interior of said channel above the layer of material therein, an element connected to the supplying means, electromagnetic means acting on the element, and a rotary switch movable by the annular member and controlling the operation of the electromagnetic means.

8. In a conveying system for pulverulent material, an inclined channel, means for supplying pulverulent material thereto, means for passing air through the material in the channel to render it sufficiently fluent to form a layer flowing through the channel, and means responsive to variations in the difference in pressure of the air before and after it has passed through the layer for varying the action of the supplying means, said responsive means including a ring balance for comparing the pressures of air before and after it has passed air through the layer, said ring balance having a member movable to different positions in accordance with said pressures under the influence of said ring balance, switch means having a plurality of contacts engaged in accordance with movements by said member, means for transmitting signals from said switch means, and an armature movable to different positions under control of such signals.

9. In a system for conveying pulverulent material, the combination of an inclined pneumatic channel having a diaphragm, means for supplying the material to the channel at the high end, a source of air under pressure, means for passing air from the source through the material on the diaphragm to render the material sufficiently fluent to form a layer flowing along the diaphragm, said means including a plurality of air pipes projecting into the layer and having outlets close to the diaphragm, and means connected to the source and to the space in the channel above the layer and responsive to the difference in pressure of the air at the source and after it has passed through the layer for varying the action of the supplying means.

10. In a system for conveying pulverulent material, the combination of an inclined pneumatic channel having an air-permeable diaphragm, means for supplying the material to the channel at the high end, means for supplying air to the channel beneath the diaphragm to flow through the diaphragm and the material thereon to render the material sufficiently fluent to form a layer flowing along the diaphragm, and means connected to the spaces in the channel above and below the diaphragm and layer and responding to the difference in pressure of the air before and after it has passed through the diaphragm and layer by varying the action of the supplying means.

11. In a system for conveying pulverulent material, the combination of an inclined pneumatic channel having a false bottom formed by an air-permeable diaphragm and solid partitions closing the space beneath the diaphragm at opposite ends of the channel, means for supplying the material to the channel at the high end thereof, means for supplying air to the space beneath the diaphragm between the partitions to flow through the diaphragm and material to render the material sufficiently fluent to form a layer flowing along the diaphragm, and means connected to the spaces in the channel above the diaphragm and beneath the diaphragm between the partitions and varying the action of the supplying means in response to variations in the difference in pressure of the air before and after it has passed through the diaphragm and layer.

12. In a system for conveying pulverulent material, the combination of a covered channel having an inclined bottom, means for supplying the material to the channel at the high end, a source of air under pressure, means for introducing air through the material to render it sufficiently fluent to form a layer flowing along the bottom of the channel, and means responsive to the difference in pressure of the air before and after it has passed through the layer to vary the action of the supplying means, said responsive means including an element movable by variations in the pressure difference and biased toward an idle position.

References Cited in the file of this patent

UNITED STATES PATENTS

| 2,410,309 | Simpson | Oct. 29, 1946 |
|---|---|---|
| 2,420,129 | Flock | May 6, 1947 |
| 2,439,721 | Dickey | Apr. 13, 1948 |
| 2,527,488 | Schemm | Oct. 24, 1950 |
| 2,636,642 | Gorin | Apr. 28, 1953 |